Dec. 11, 1934.  R. E. RILEY  1,983,677
METHOD OF MAKING SPONGE RUBBER ARTICLES
Filed Nov. 8, 1933

Inventor
Ralph E. Riley
By Eakin & Avery Attys.

Patented Dec. 11, 1934

1,983,677

UNITED STATES PATENT OFFICE 1,983,677

METHOD OF MAKING SPONGE RUBBER ARTICLES

Ralph E. Riley, Akron, Ohio, assignor to The B. F. Goodrich Company, New York, N. Y., a corporation of New York Application November 8, 1933, Serial No. 697,157

3 Claims. (Cl. 18—59)

This invention relates to the manufacture of sponge rubber articles and is especially useful in the manufacture of bathing caps and similar thin walled articles.

The principal objects of the invention are to provide a soft porous thin-walled article having a novel appearance and to provide a novel method of manufacturing such articles.

Other objects will appear from the following description and the accompanying drawing.

Figure 1:
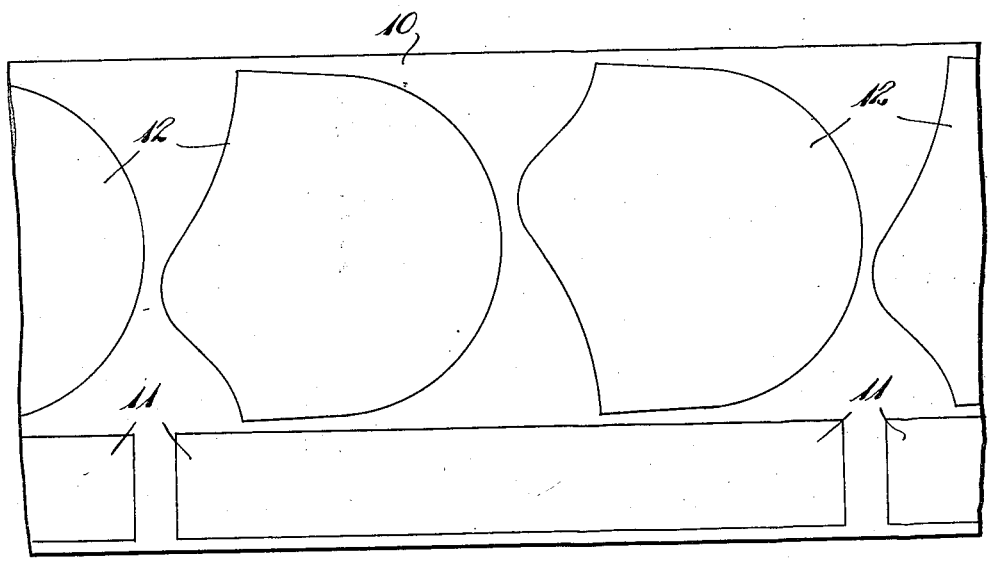
Fig. 1 is a plan view of a sheet of calendered rubber showing the arrangement of parts of a bathing cap as cut from the sheet.
Figure 2:
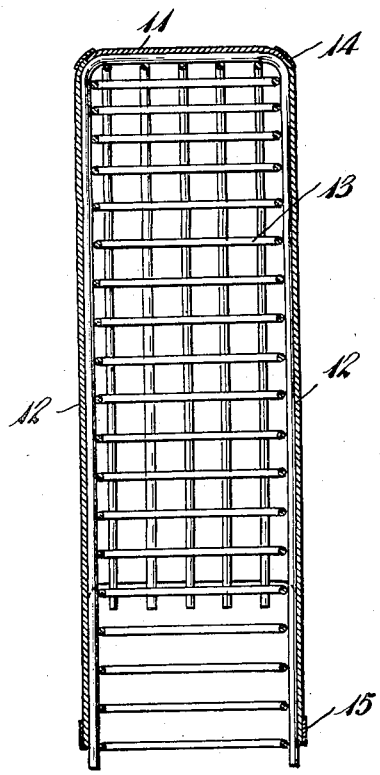
Fig. 2 is a cross section of a building and curing form with the unvulcanized cap thereon.
Figure 3:
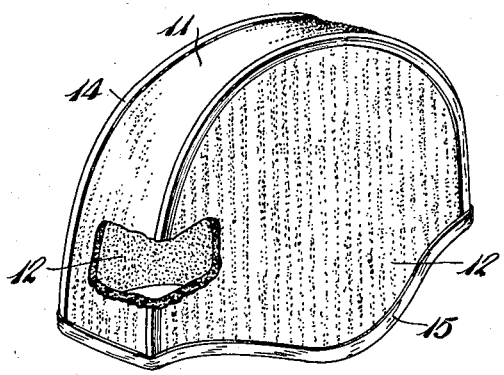
Fig. 3 is a perspective view of a finished bathing cap, parts being broken away to show its structure.

Referring to the drawing, in the manufacture of thin walled sponge rubber articles, of which the bathing cap shown is an example, the sponge rubber composition adapted to be vulcanized in air is sheeted out on a calender to provide a thin sheet 10 about one third as thick as the walls of the desired article. The various parts of the article, such as the side pieces 12 and the band 11, are cut from the sheet by means of suitable cutting dies. A building and curing form 13, having a perforate surface and shaped to the form of the desired article, is provided. It is desirable to so construct this form as to contact as little as possible with the calendered sheet material and therefore to have a large proportion of the contacting wall of the article exposed to the air or other heating medium. To this end, the form is preferably constructed from metallic wire, woven or otherwise arranged in reticulated form.

The pieces 11 and 12 are assembled over the form and their edges adhesively united in abutting relation. This may be accomplished merely by wiping the dust from the edges of the otherwise tacky material. Where it is desired to provide trimming strips of contrasting color or to reinforce the seams, strips 14 and 15, preferably of a non-blowing stock, are cemented or otherwise adhesively applied over the seams or wherever desired for ornamentation.

The form upon which the article has been built is now placed in an oven and the rubber vulcanized in heated air. The walls of the article, under the influence of the vulcanizing heat, become cellular and expand to about three times the original thickness. The cells, formed by action of the heat, gas being evolved from the blower contained in the rubber composition, burst and form eruptions, upon both surfaces of the article. The expansion of the sheet material occurs to a greater degree where the rubber is free from contact with the wires or other supporting surfaces of the form, producing a peculiar furrowed appearance in the finished article, which generally enhances the appearance of the article.

Unvulcanized sponge rubber composition contains a gas forming substance commonly known as "blower". This material is finely divided and distributed throughout the mass. Under the influence of heat the gas is released and forms cells throughout the mass. Where two bodies of unvulcanized sponge rubber composition are joined before vulcanization and then subjected to vulcanizing heat, the particles of blower near the seam cause cells to form which cross the original line of the seam during their growth, thereby inseparably interlocking the bodies at the seam. This interlocking of the cells is a characteristic of a union of sponge rubber bodies prior to vulcanization. After vulcanization the seam cannot be opened by the application of rubber solvents.

While a bathing cap has been chosen as an article to illustrate the method of manufacture, it is apparent that other articles such as shoes, bathing suits, and many other articles may be similarly manufactured.

I claim:

1. The method of making sponge rubber articles which comprises calendering a sponge rubber composition to produce a sheet thinner than the walls of the desired article, cutting sections therefrom, assembling the sections upon a reticulated form, and vulcanizing the article by application of heat.

2. The method of making sponge rubber articles which comprises assembling a plurality of thin sheets of sponge rubber composition upon a reticulated form to provide an unvulcanized article having the shape of the finished article, and vulcanizing the article while on the form by the application of heat.

3. The method of making sponge rubber articles which comprises assembling a plurality of thin sheets of sponge rubber composition upon a form having a field of openings in its surface comprising the greater part of its area, and vulcanizing the article while supported on the form by application of heat.

RALPH E. RILEY.